No. 619,798. Patented Feb. 21, 1899.
W. G. SHAFER.
ANIMAL RELEASING DEVICE.
(Application filed Mar. 3, 1898.)

(No Model.) 2 Sheets—Sheet 1.

Witnesses
Inventor
Wm. G. Shafer,
Attorneys

No. 619,798. Patented Feb. 21, 1899.
W. G. SHAFER.
ANIMAL RELEASING DEVICE.
(Application filed Mar. 3, 1898.)
(No Model.) 2 Sheets—Sheet 2.
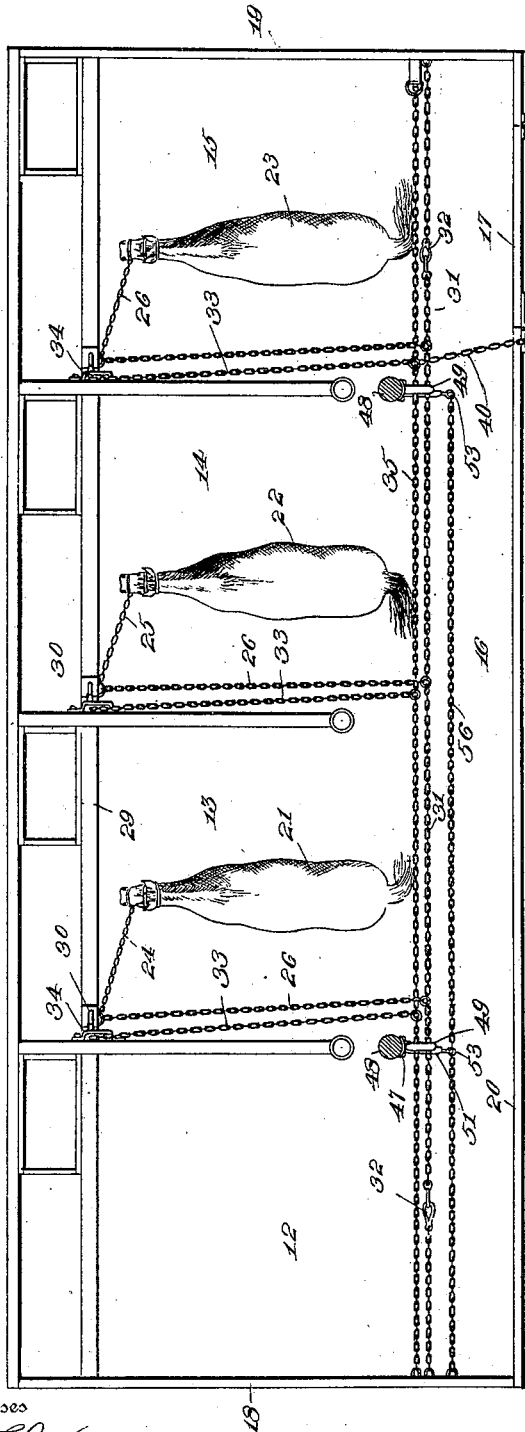
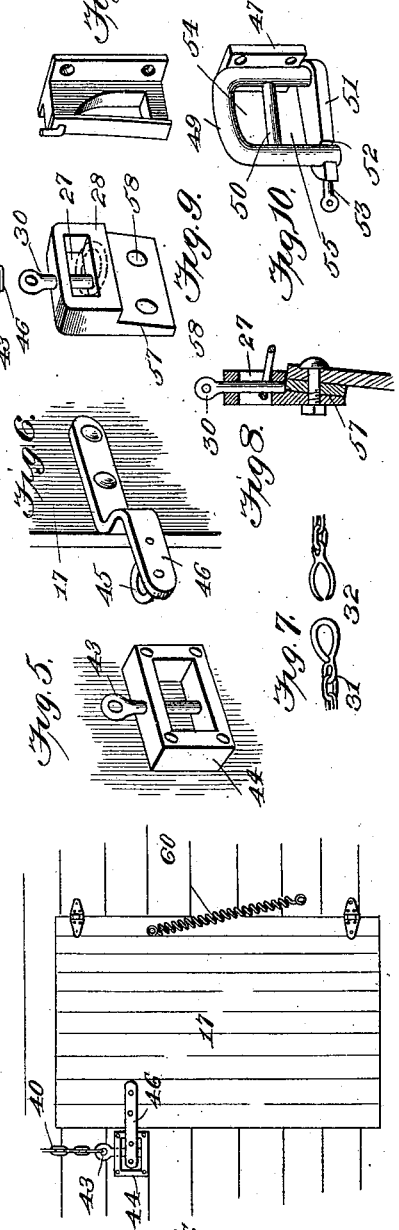
Witnesses
J. C. Shaw
Chas. E. Brock
Inventor
Wm. G. Shafer,
by Munn & Co.
Attorneys
THE NORRIS PETERS CO., PHOTO-LITHO., WASHINGTON, D. C.

UNITED STATES PATENT OFFICE.

WILLIAM G. SHAFER, OF PERU, INDIANA.

ANIMAL-RELEASING DEVICE.

SPECIFICATION forming part of Letters Patent No. 619,798, dated February 21, 1899.

Application filed March 3, 1898. Serial No. 672,446. (No model.)

*To all whom it may concern:*

Be it known that I, WILLIAM G. SHAFER, a citizen of the United States, residing at Peru, in the county of Miami and State of Indiana, have invented a new and useful Animal-Releasing Device, of which the following is a specification.

My invention is in the nature of a mechanism to be erected in a stable for the purpose of releasing horses from the stalls thereof, the object of the invention being to furnish an improved apparatus for application to the stalls of a stable by means of which all horses or other animals haltered in the stalls may be released and led from the stable when—as, for instance, in the case of fire—there may not be sufficient time to enter each stall and release and lead out the animals singly, the apparatus being so constructed that the animals, when released and, owing to fright, refusing to leave their stalls, will be all simultaneously led out from the stalls and stable.

With this object in view my invention consists in the improved construction, arrangement, and combination of parts hereinafter fully described, and afterward specifically pointed out in the appended claims.

In order to enable others skilled in the art to which my invention most nearly appertains to make and use the same, I will now proceed to describe its construction and operation, reference being had to the accompanying drawings, forming part of this specification, in which—

Figure 1:
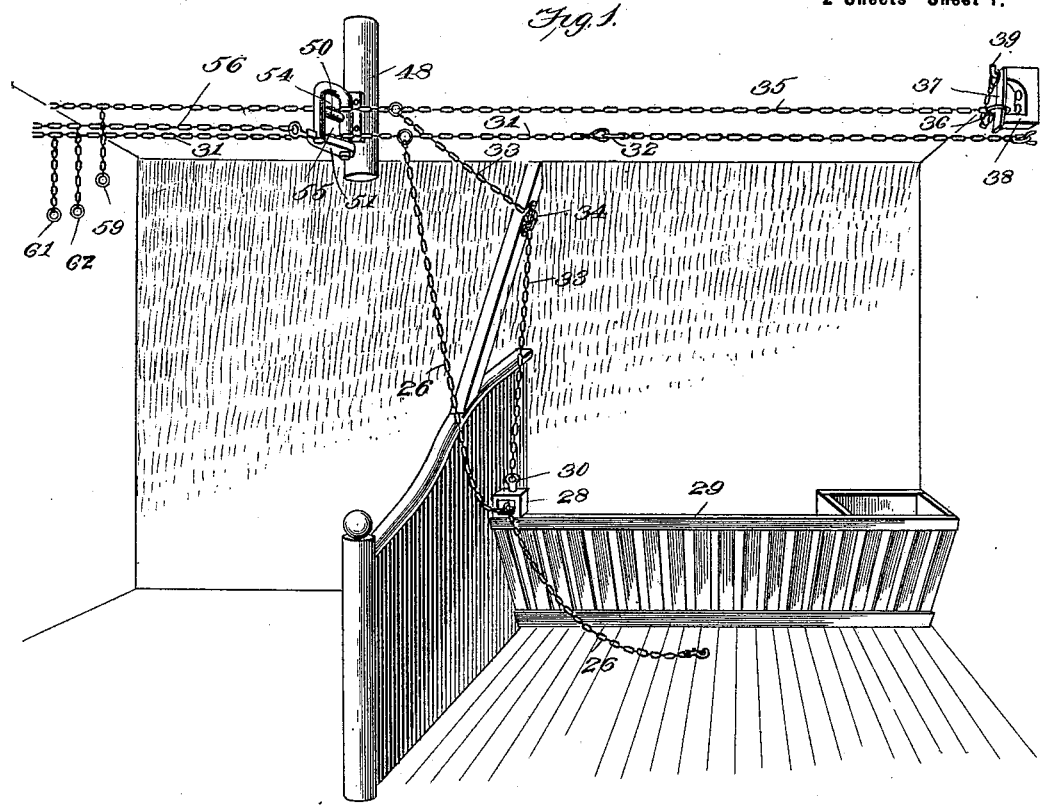
Figure 2:
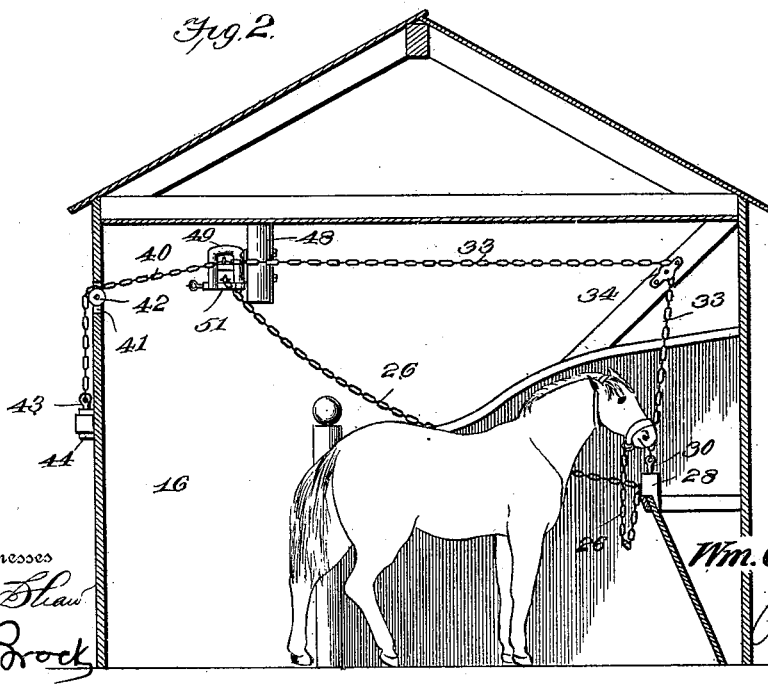

Figure 1 is a perspective view of the interior of a stable, illustrating the practical application of my invention. Fig. 2 is a transverse sectional view through the stable. Fig. 3 is a top plan view of a stable equipped with my invention with the roof removed and with parts shown in section. Fig. 4 is a detail view in elevation illustrating the latching and releasing devices for attachment to the door of the stable or box-stall. Fig. 5 is a detail perspective view, on an enlarged scale, of one member of the door-latch. Fig. 6 is a similar view of the other member. Fig. 7 is a detail perspective view illustrating the manner of connecting the chains. Fig. 8 is a detail sectional view of the upper part of the front of the manger with the hitching and releasing means shown. Fig. 9 is a detail perspective view of the hitching and releasing mechanism detached. Fig. 10 is a detail perspective view of the device for dropping the leading-chain to the ground. Fig. 11 is a detail perspective view of the attaching device for the end of the releasing-chain.

Like numerals of reference mark the same parts wherever they occur in the various figures of the drawings.

Referring to the drawings by numerals, 12, 13, 14, and 15 indicate the stalls of a stable arranged side by side, as is usual, each being provided with the usual feeding arrangements and opening into a passage 16, leading from end to end of the stable, ingress to and egress from said passage being through a door 17, hinged to open outward.

18 and 19 indicate the end walls, and 20 the front wall of a stable.

In Fig. 3 I have indicated the stalls 13, 14, and 15 as occupied by horses 21, 22, and 23, each of which is haltered by means of a chain, as at 24, 25, and 26, each of said chains being provided with a large link to enter a recess 27 in a block 28, secured upon the upper edge of the front 29 of the manger, the pin 30 being dropped downward through said large link to secure the horses in the stalls. The chains 24, 25, and 26 extend from said link backward to a chain 31, extending from end to end of the stable overhead in the passage 16, separable connecting-links 32 being inserted near each end, whereby the chain can be parted when desired.

The pin 30 before referred to is secured upon the end of a chain 33, which passes upward over a pulley at 34 and rearward, being connected to a line-chain 35, extending from end to end of the stable, a link 36, near one end, being engaged upon a spring 37, secured to a casting 38, attached to the end wall 19 of the stable. This line-chain 35 extends for a short distance—say about one foot—beyond the link 36, and its extreme end link is engaged on a hook 39. A short chain 40 extends from the line-chain 35 through an opening 41 in the front wall of the stable alongside of the door 17 and passes over a pulley 42, and carries at its lower end a pin 43 in the latch-frame 44, designed to engage a staple 45 of a hasp 46, secured to the door 17.

A bracket 47 is secured to a short stud 48, depending from the ceiling in line with and to the rear of the stall-partition, said bracket carrying an inverted staple 49, the legs of which are connected by a cross-bar 50 at about their mid-length and at their lower ends by means of a swinging bar 51, pivoted to the bottom of one of the legs and having a notch 52 near its free end to engage the other leg, an eyebolt 53 projecting beyond its free end. There are a number of these brackets, depending upon the number of the stalls, although I do not deem it necessary to provide more than half as many as there are stalls, a stud with connected bracket depending in the rear of each alternate stall-partition.

The line-chain 35, to which are secured the pin-carrying releasing-chains 33, is passed through the upper opening 54 of the brackets 47 and the line-chain 31 through the lower opening 55 of said brackets. The line-chain 56 is connected to the eyebolts 53, which project from the swinging bars 51 of the brackets 47, said line-chain extending to the end wall 18 of the stable.

The hitching-block 28 has its lower portion cut away to form a beveled flange 57, provided with bolt-holes 58, the inclination of the bevel being equal to that of the front of the manger, so that when the beveled surfaces are brought into engagement and bolted together the block will extend in a true vertical line.

The construction of my invention will be readily understood from the foregoing description, and its operation may be described as follows: The stalls being occupied by the horses, as illustrated in Fig. 3, and fire breaking out in the stable in such a position and to such an extent as to preclude the possibility of entering each stall and releasing and leading out the animals separately, the person discovering the fire can release and lead out all the animals by first pulling downward on the ring 59, (illustrated in Fig. 1 as inside the stable, but which may be outside or duplicated outside,) said ring being connected to the line-chain 35. The first effect of the pull on this chain will be to release its link 36 from the spring 37, which will permit the chain to be moved longitudinally until the short end of the chain reaching from the link 36 to the hook 39 is straightened out. This pull will be sufficient to draw the connecting-chains 33 a sufficient distance to release the pin 30 from engagement with the hitching-chain 26. At the same time the chain 40 will be drawn along with the chain 35, thus releasing the pin 43 from the staple 45 of the hasp 46 and permitting the spring 60 to throw open the door 17 of the stable or the door of a box-stall when when such construction is used. The ring 59 is now released and the ring 61 pulled downward, which draws the chain 31 longitudinally through the lower recesses 55 of the brackets 47, said chain 31 being broken at the spring-links 32, the short ends beyond said links dropping against the wall. The pull upon the chain 31 draws upon the hitching-chains and turns the horses' heads toward the rear of the stall. The chain 31 is now released, and by pulling upon the ring 62, attached to the chain 56, the swinging bars 51 at the bottoms of the brackets 47 are drawn aside, thus releasing the chain 31 and the hitching-chains and dropping them to the ground, so that by again pulling upon the chain 31 through the door the horses may be all led out hitched together.

While I have illustrated and described the best means now known to me for carrying out my invention, I do not wish to be understood as restricting myself to the exact details of construction shown, but hold that any slight changes or variations such as might suggest themselves to the ordinary mechanic would properly fall within the limit and scope of my invention.

Having thus fully described my invention, what I claim as new, and desire to secure by Letters Patent of the United States, is—

1. The combination with a line-chain, extending from end to end in the rear of the stalls, of an enlarged link, located at a short distance from one end thereof, a bracket, secured to the wall of the stable, a flat spring for engaging the large link of the chain, a hook, projecting from the bracket, a short length of chain beyond the large link, engaging the hook, a hitching device at each stall, provided with a vertically-movable pin, and a chain connecting the said pin with the line-chain, substantially as described.

2. The combination with a line-chain secured to the wall of a stable, extending from end to end of the stable, of hitching-chains secured thereto, brackets, secured to depending studs, swinging bottom bars on said brackets, the line-chain passing through recesses in the brackets and resting on said swinging bars, and a line-chain connecting the outer ends of the swinging bars, and the detachable link whereby they may be all simultaneously swung aside to drop the chains to the ground, substantially as described.

3. The combination with the line-chain secured to the end wall of a stable and carrying releasing-chains, of a bracket, consisting of a flat plate secured to the wall, provided with a vertical, recessed flange extending therefrom, a flat, metallic spring, closing the front of the recess in the flange, a hook, serving also as a fastening for the spring, the chain being provided with a large link to engage the spring, and a short section beyond the link to engage the hook, substantially as described.

4. The combination with the depending studs, of the brackets, each consisting of an attaching-plate, an inverted staple secured to the front face thereof, a cross-bar connecting the two legs of the staple and forming an upper and a lower recess, a bar, pivotally swung upon the lower end of one leg and adapted to engage the lower end of the other leg to close the lower recess, and an eyebolt, projecting from the outer end of the swinging bar, substantially as described.

WILLIAM G. SHAFER.

Witnesses:
 JOSEPH B. KUNSE,
 J. T. MILLER.